(Model.)
2 Sheets—Sheet 1.
J. C. STUCHEL.
DEVICE FOR THREADING NUT BLANKS.
No. 481,437.
Patented Aug. 23, 1892.
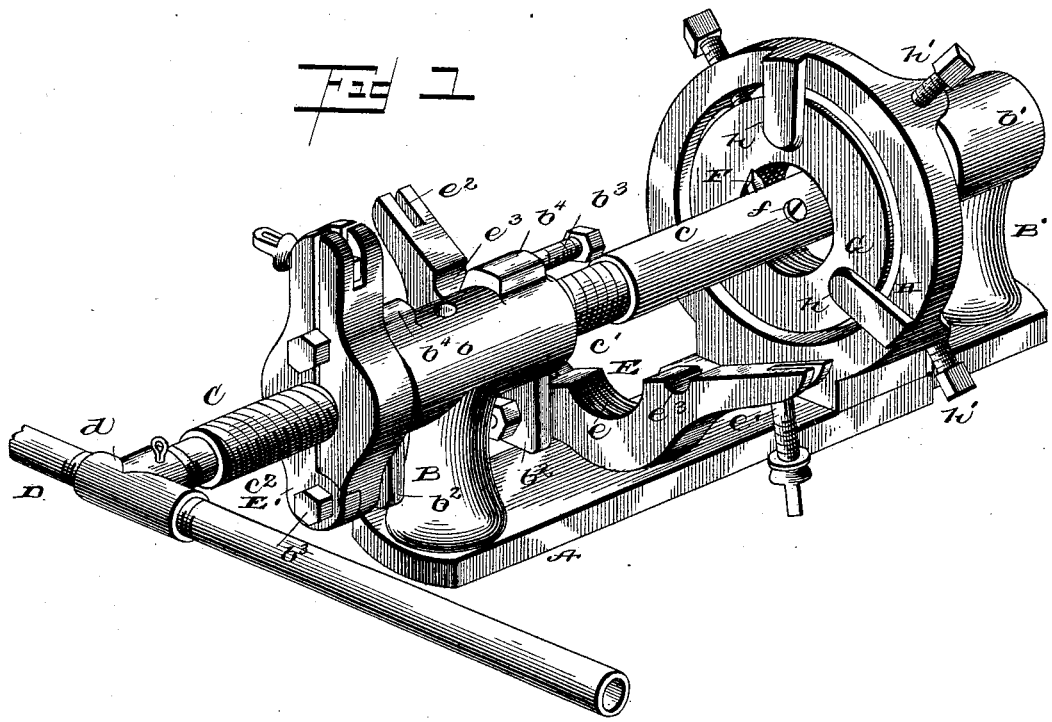
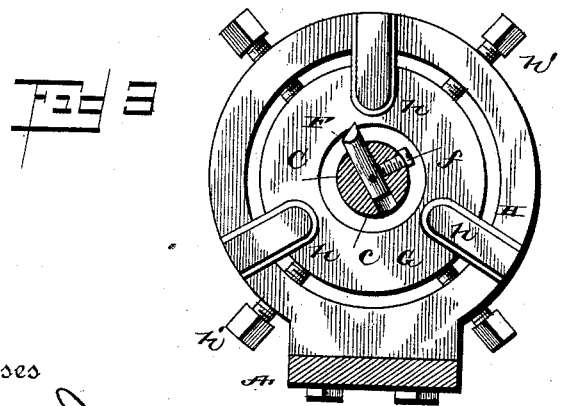
Witnesses
John Duivie
Wm W Deane.
Inventor
John C Stuchel
By his Attorney
L. Deane (Model.)  2 Sheets—Sheet 2.
J. C. STUCHEL.
DEVICE FOR THREADING NUT BLANKS.
No. 481,437.   Patented Aug. 23, 1892.
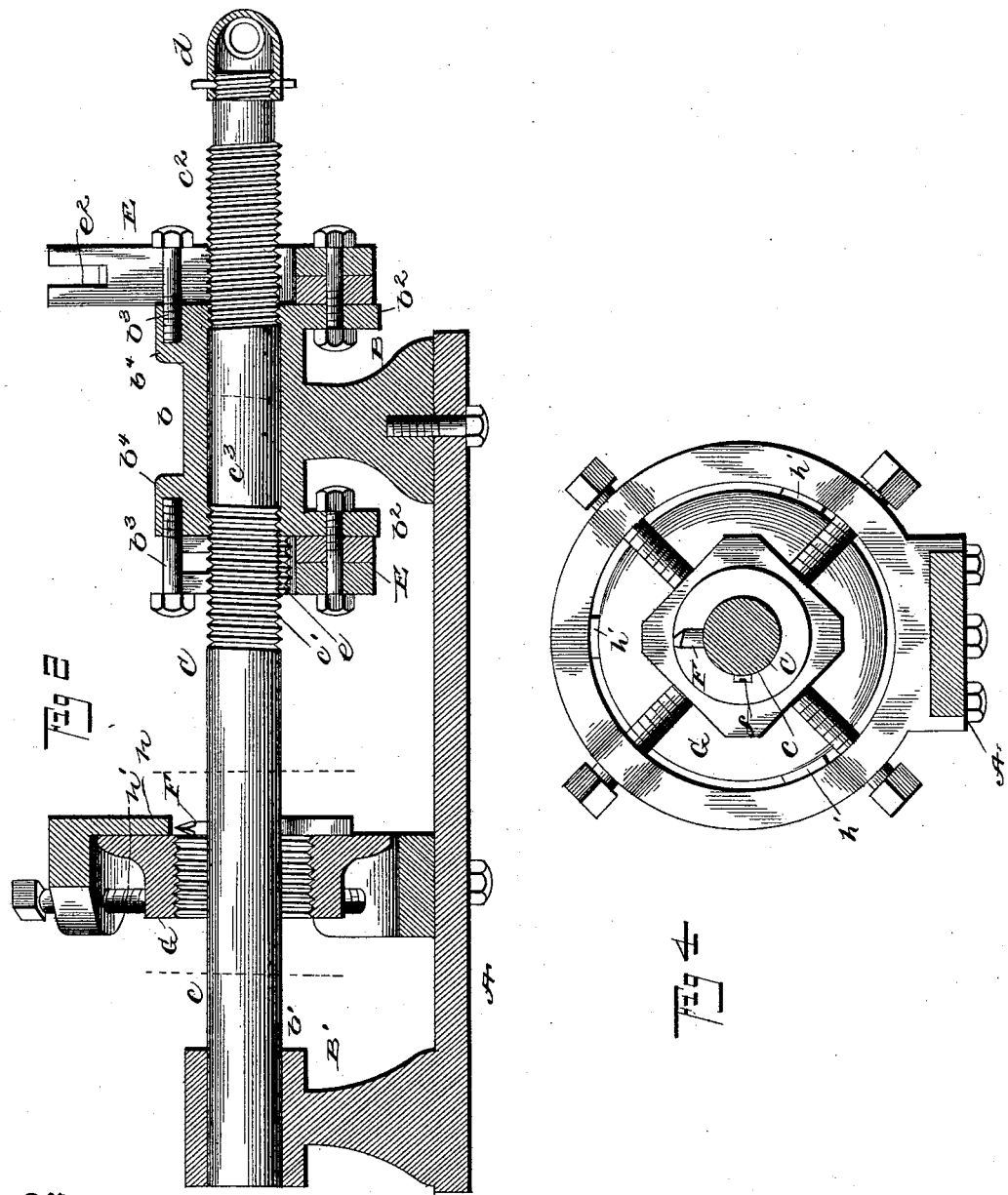
Witnesses
John Irvine
Wm A Deane
Inventor
John C. Stuchel
By his Attorney
L. Deane

UNITED STATES PATENT OFFICE.

JOHN C. STUCHEL, OF INDIANA, PENNSYLVANIA.

DEVICE FOR THREADING NUT-BLANKS.

SPECIFICATION forming part of Letters Patent No. 481,437, dated August 23, 1892.

Application filed November 12, 1891. Serial No. 411,761. (Model.)

*To all whom it may concern:*

Be it known that I, JOHN C. STUCHEL, a citizen of the United States, residing at Indiana, in the county of Indiana and State of Pennsylvania, have invented certain new and useful Improvements in Devices or Tools for Cutting Screw-Threads in Nuts; and I do hereby declare the following to be a full, clear, and exact description of the invention, such as will enable others skilled in the art to which it appertains to make and use the same.

Figure 1 is a perspective view of this tool or device. Fig. 2 is a longitudinal central section of portion of Fig. 1, but showing the shaft or rod which does the thread-cutting as in position in the tool. Fig. 3 is a detail showing one side of the chuck with a nut in position to be screw-threaded. Fig. 4 is a detail showing same from opposite side of chuck.

This invention relates to improvements in that class of tools or devices designed for cutting screw-threads in nuts; and the novelty consists, in general, in a base or frame carrying a longitudinally-movable shaft screw-threaded at different points along its length, respectively right and left, and having a cutter fixed to it and combined with screw-threaded split nuts and a chuck in such a manner that either of said screw-threads can be employed to screw-thread the nut held in said chuck either right or left, as may be desired; also, in the structure of the several parts composing this device; also, in the combination of each of the individual parts with the other; also, in the device in its entirety and as a whole, all as will now be more fully described, as well as pointed out in the claims.

In the accompanying drawings, A denotes any suitable metal or other base. Near the respective ends of this base rise the vertical posts B and B', having on their respective upper ends a sleeve $b$ and $b'$, the two sleeves being in alignment with each other. Through these two sleeves passes the shaft or rod C, the longer portion $c$, which in part moves in the sleeve $b'$, being smooth; but toward the other end at $c'$ and $c^2$ are cut, respectively, right and left hand screw-threads, and between these two screw-threads is a smooth portion $c^3$, by which they are separated from each other. The portion $c^3$ of this rod moves in the sleeve $b$, and the right-hand thread projects inwardly from this sleeve and the left-hand thread outwardly. On the outer end of this rod by means of its T-piece $d$ are fixed the handles D, by means of which the rod or shaft C is operated.

At each end of the sleeve $b$, preferably on the under side, is a lug or ear $b^2$. To the one on the inner end are pivoted the ends of the split nut E. This is screw-threaded in both parts at $e$ to correspond with the right-hand thread $c'$ of the rod C. Thus when this nut is closed upon the rod or shaft C and locked by means of the latch $e'$, which is pivoted to one side of the nut and adapted in locking the nut to fit into seat $e^2$ in the other side, its thread $e$ meshes with the thread $c'$ of the rod C. Thus when these parts are so combined together this rod will when rotated operate to the right. In the like manner at the other end of the sleeve $b$ are pivoted the ends of the split nut E', which, excepting that it has a left-hand screw-thread, is like the split nut E. Of course when this nut is closed upon the screw-thread $c^2$, the parts of the nut E having been released from the rod, the rod will when rotated have a left-hand movement. On the inner face of each jaw of these nuts, so as to come above the rod C, is a groove $e^3$. When the jaws are closed, these grooves in each nut fit tightly upon a headed screw-bolt $b^3$. The inner end of this bolt takes into a seat $b^4$ on the sleeve $b$. Thus when each jaw is locked by means of this bolt $b^3$ the closed jaw can be more rigidly fixed in position by screwing the rod $b^3$ tight home. This rod C has about centrally in its smooth portion $c$ the cutter F fixed rigidly thereto, but so as to be adjustable by means of the set-screw $f$. Now when the nut G is centered in the chuck H, which chuck is rigidly fixed at its lower side to the base A and extends upwardly between and at right angles with the sleeves $b$ $b'$, the cutter F can at will be made to form a right or left hand screw-thread in the nut G by manipulating the nuts E or E', so that the rod can, as above described, be made to move in either direction. The nut G is centered in the chuck H by placing it in the first instance flat against the fingers $h$, projecting inwardly from the periphery of the chuck on one side, and by setting home against the sides of the nut the screw-bolts $h'$, operating inwardly from the periphery of the chuck on the side opposite the fingers.

It will be obvious to any one skilled in this class of devices that in very many ways merely mechanical changes can be made in the structure of the several parts of this tool or machine, as well as in their combination with each other, without in any essential degree departing from the nature and scope of this invention.

It will be noticed that this device is exceedingly compact as well as simple in its structure and that it can do its work in the quickest and most efficient manner. The ease and efficiency by which its operation can be changed so as to cut a right-hand thread is its most distinguishing point of excellence.

Having now described my invention, I claim—

1. In a nut-threading device, a rod provided with a right and left hand screw and cutting-bit and combined with right and left hand screw-threaded split nuts and with a chuck for holding the nut, in the manner and for the purposes set forth.

2. In combination with the base A, having posts B B' at its respective ends, each provided with a sleeve at its upper end, the split nuts E E', pivoted on the former sleeve, screw-threaded, as set forth, with the rod C, screw-threaded and otherwise, as described, and the chuck H.

3. In a machine or tool as set forth and in combination with the sleeve B, the split nuts E and E', respectively pivoted to the sleeve on its ears $b^2$ and screw-threaded at $e$, recessed at $e^3$, provided with a locking-latch $e'$, and adapted to be fixed firm in position by bolt $b^3$, all substantially as and for the purposes set forth.

4. The rod C, having smooth portions and screw-threaded portions, as set forth, and a cutting-bit F near its middle part, combined with the sleeves $b\ b'$, and means for causing it to cut a right or left hand screw-thread, and a centering-chuck, all as described.

In testimony whereof I affix my signature in presence of two witnesses.

JOHN C. STUCHEL.

Witnesses:
JNO. R. CALDWELL,
M. L. CARNAHAN.